Sept. 20, 1966  B. L. LEWIS  3,274,604
MULTI-MODE SIMULTANEOUS LOBING ANTENNA
Filed Dec. 12, 1958  4 Sheets-Sheet 3
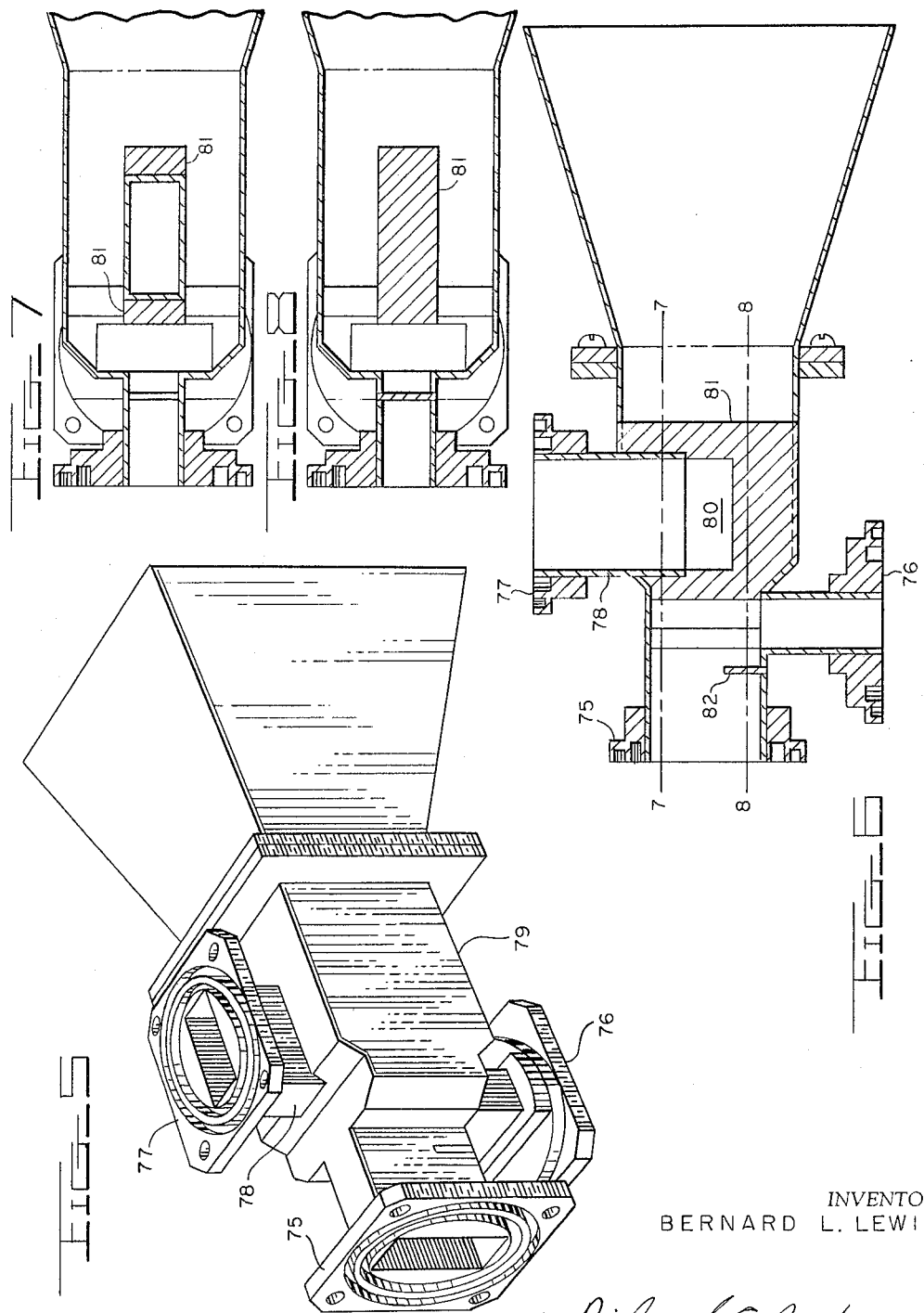
INVENTOR
BERNARD L. LEWIS
ATTORNEY Sept. 20, 1966    B. L. LEWIS    3,274,604
MULTI-MODE SIMULTANEOUS LOBING ANTENNA
Filed Dec. 12, 1958    4 Sheets-Sheet 4
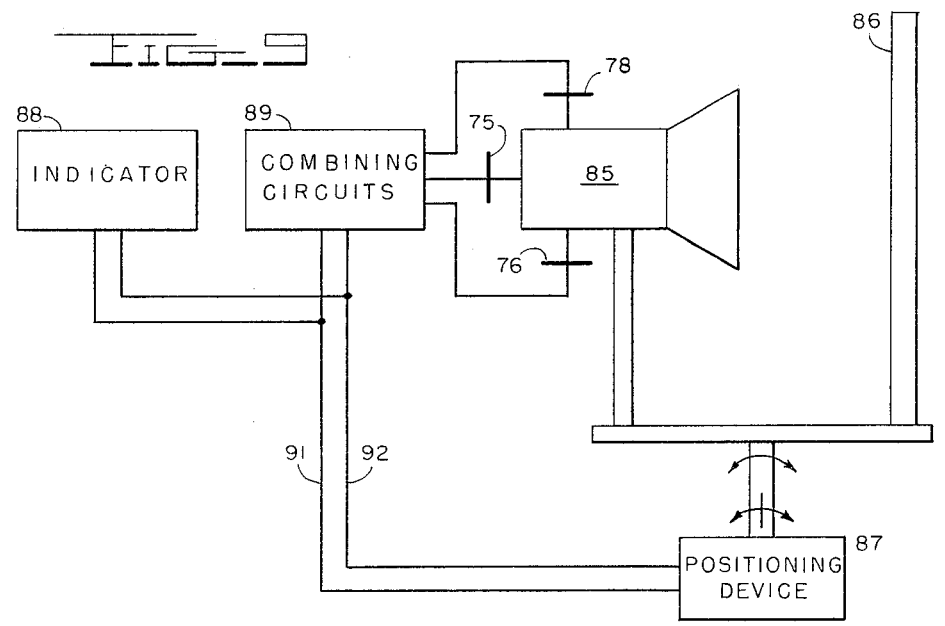
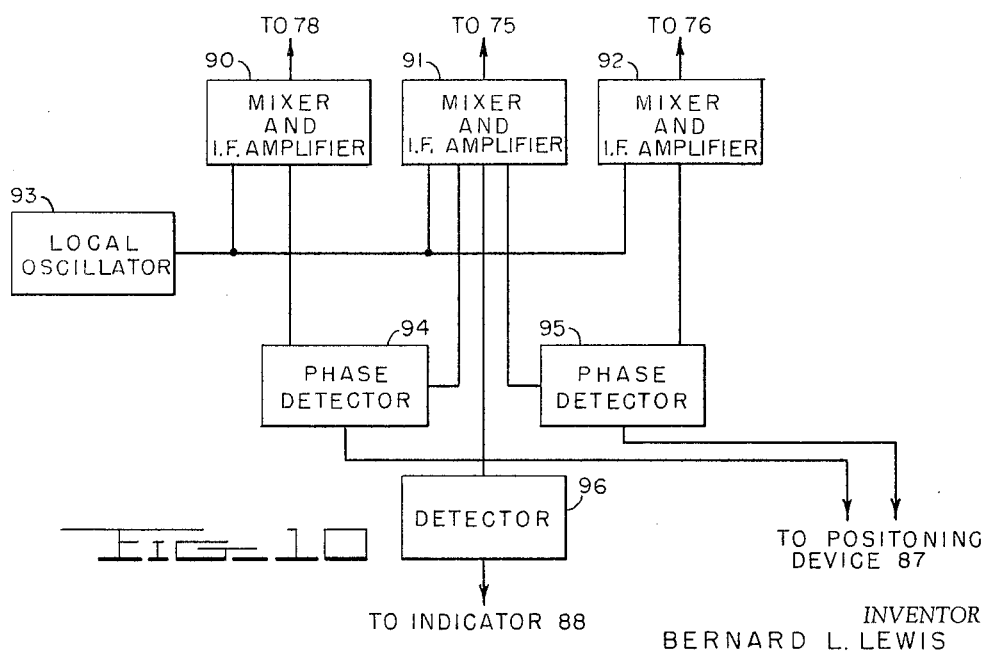
INVENTOR
BERNARD L. LEWIS
BY Richard C. Reed
ATTORNEY

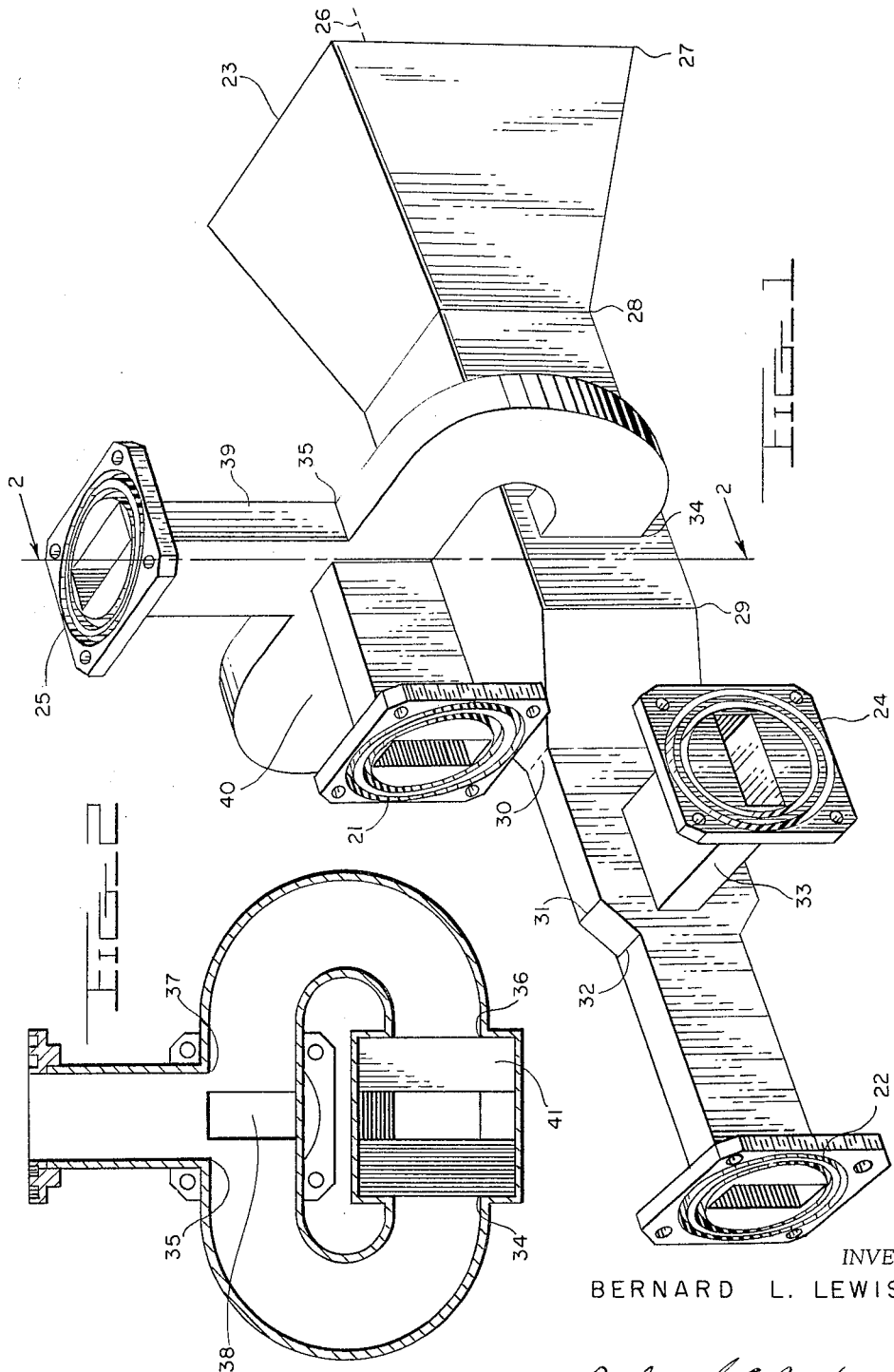

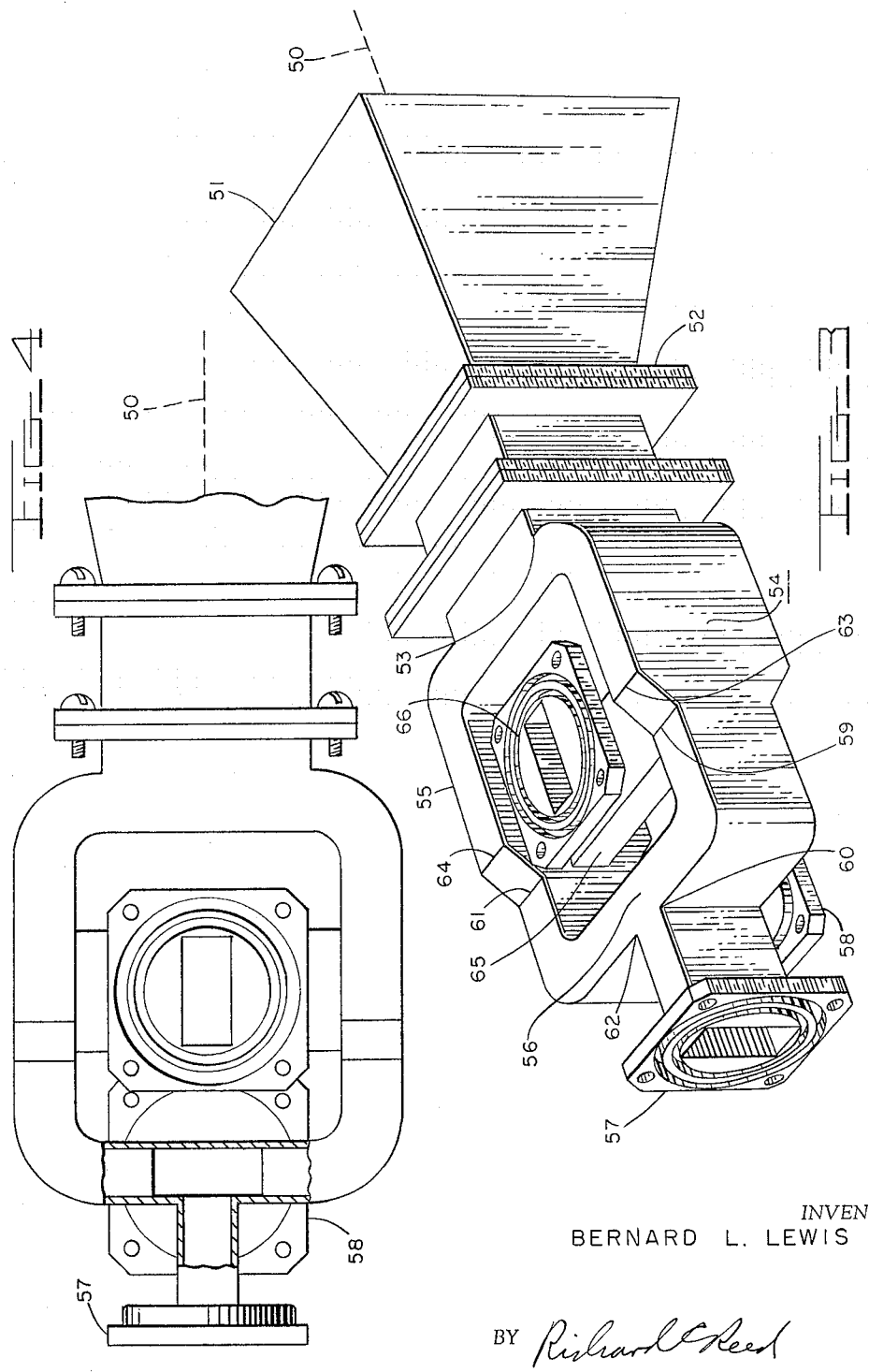

United States Patent Office 3,274,604
Patented Sept. 20, 1966

3,274,604
MULTI-MODE SIMULTANEOUS LOBING
ANTENNA
Bernard L. Lewis, Winter Park, Fla.
(1239 Seminole Drive, Satellite Beach, Fla.)
Filed Dec. 12, 1958, Ser. No. 780,175
5 Claims. (Cl. 343—786)

The invention described herein may be manufactured and used by or for the Government of the United States of America for governmental purposes without the payment of any royalties thereon or therefor.

This invention relates in general to antenna systems and in particular to antenna feed systems for radar apparatus wherein angle sensing is obtained by a single horn radiator system.

Object locator systems such as radar devices normally provide some form of angle sensing mechanism whereby the direction of a distant energy reflective object may be determined in at least one and usually two planes, that is, elevation and azimuth. Such angle sensing apparatus may be comparatively simple where only rough measurements are to be taken, but in applications where accurate angular measurement capabilities are desired as in gunfire control systems, missile guidance systems, and the like, complex equipment is normally required. Such equipment in addition to being complex must also be of an extremely precise nature requiring considerable accuracy in construction and maintenance to secure accuracy of operation. Although sequential lobing systems as well as conical scanning systems possess certain inherent simplicity, systems of the so-called simultaneous lobing type are of considerable importance because of the potentially greater accuracy of such systems as well as a greater degree of freedom from interference. Such simultaneous lobing systems frequently employ some form of secondary aperture device such as a lens or a parabola either of which is illuminated from a primary radiator such as a dipole or a horn placed at the focus of the secondary aperture. The difficulty with prior art systems however lies in the necessity for the placement of four primary radiators at the focus of the secondary radiator so that energy received from four slightly divergent lobes combines in such a way as to derive angular information relative to the direction of receipt of energy from a distant energy return object. The placement of four comparatively large primary radiators such as horns and their feed and combining systems together in a cluster is attended by numerous difficulties. In the first place each horn has its dimensions determined by the wavelength of the signal employed so that a four horn cluster is necessarily bulky in terms of wavelength and when used in connection with a parabola provides excessive shadow. An additional disadvantage of the conventional four horn cluster feed is the inherently narrow band of operation resulting from the necessity for the combination in phase opposition of signals from opposing zones of reception. Phase opposition combination is normally accomplished in such systems by employing combining signal paths which differ in length by a multiple of half-wavelengths, making such feed systems sensitive to the wavelength of operation. Further difficulties inherent in such a four horn cluster are concerned with the desire for providing optimum illumination of the secondary aperture by the four horn cluster to assure a minimum loss of energy around the sides of the secondary aperture and substantially uniform illumination of the aperture itself. In any event, illumination is a compromise matter which is difficult to optimize with even a single horn much less with a four horn cluster.

It is an object of the present invention to provide a primary radio frequency radiator system of small size.

It is an object of the present invention to provide a single horn primary radiator which can be constructed with no dividing septums which can be employed to derive lobing information.

Another object of the present invention is to provide a primary radiator for a simultaneous lobing locator system by means of which the overall antenna beamwidth and illumination of the secondary radiator can be readily adjusted.

Another object of the present invention is to provide a primary radiator for a simultaneous lobing locator system in which the radiator itself as well as the interconnections thereto have a broad frequency bandwidth.

Another object of the present invention is to provide a primary radiator system for a simultaneous lobing radar system in which signals of two different frequencies may be radiated simultaneously without interaction therebetween.

Other and further objects and features of the present invention will become apparent upon careful consideration of the accompanying specification and drawings, wherein:

FIG. 1 shows an overall view of one embodiment of the features of the present invention;

FIG. 2 is a cross-section of a portion of the apparatus of FIG. 1;

FIG. 3 is a view of a second embodiment of the teachings of the present invention;

FIG. 4 shows a portion of the apparatus of FIG. 3 partially in section form;

FIGS. 5, 6, 7 and 8 indicate a further variation of the present invention permitting even greater reduction in size;

FIG. 9 indicates in general how a horn system constructed in accordance with the foregoing would be incorporated into a radio frequency system such as a direction finder although it is readily appreciated that the system of FIG. 9 could operate as a radar system with the inclusion of a transmitter;

FIG. 10, indicates a typical combination of components in the combining circuits 89.

In accordance with the teachings of the present invention a primary radiator for a radio-frequency energy operative object locator system is provided wherein a single horn is employed to derive angle sensing information of distant objects in distinct contrast to the multi-horn arrangements required by prior art. The invention utilizes higher order modes excited in a waveguide capable of supporting them by off-axis impingement upon an end thereof by radio-frequency energy. The present invention provides an apparatus which produces higher order modes in dependency on angular variations of direction of receipt of energy from a selected axis with respect to said waveguide and also provides apparatus capable of extracting the energy contained in the various modes in such a manner as to provide signals which can be readily used to indicate the angular variations of the direction of receipt of radio-frequency relative to the selected axis.

With reference now to FIG. 1 of the drawings, a single horn radiant energy emitter system is provided which may be used directly as an antenna or which may be employed to illuminate a secondary reflector such as a lens or a parabola. Radio-frequency energy for transmission purposes may be supplied to waveguide ends 21 and 22 from some external radar transmitter not shown, to be radiated from opening 23 which is directed into space or in the direction of a lens or a reflector. Return energy incident upon opening 23 is channeled to waveguide ends 24 and 25 being characteristic of the displacement of the energy return object in each of two planes from the longitudinal axis 26 of the horn assembly. The waveguide horn assembly of FIG. 1 contains a plurality of waveguide sections of different dimensions to support or reject energy propagation in various selected modes. The section from transverse plane 27 to transverse plane 28 is a horn flare, the purpose of which is to provide an improvement in impedance match to free space or to a secondary radiator which ever happens to be located in the direction of the longitudinal axis 26.

The waveguide section between planes 28 and 29 is a square waveguide of such proportions as to support energy propagation in four modes namely, the $TE_{10}$ mode, the $TE_{20}$ mode, the $TE_{11}$ mode and the $TM_{11}$ mode. The next portion of the main waveguide between planes 29 and 30 is tapered in the E plane. This particular taper is of such dimensions as to appear as a short circuit to the $TE_{11}$ and $TM_{11}$ modes which may be excited in the square waveguide causing them to be reflected back in the direction of plane 28. The waveguide portion between planes 30 and 31 is of such transverse dimensions as to support energy propagation in the $TE_{20}$ mode while a second taper between planes 31 and 32, a taper in the H plane, provides a final waveguide dimension between plane 32 and the end 22 which is of such proportion as to support only the $TE_{10}$ mode. Thus the tapered section 31–32 acts as a short circuit to the $TE_{20}$ mode to cause the reflection of energy thereof backward in the direction of plane 28. Waveguide end 24 is connected to the main waveguide section between planes 30 and 31 by means of a broad wall coupler 33 which couples out energy originally contained in the waveguide within the planes 30–31 in the $TE_{20}$ mode to appear at waveguide end 24 in the $TE_{10}$ mode but having amplitude and phase dependency upon the amplitude and phase of the $TE_{20}$ mode energy which existed in the waveguide from plane 28 to plane 31.

The extraction of energy of the $TE_{11}$ and the $TM_{11}$ modes is accomplished by couplers placed in two walls of the square waveguide section between planes 28 and 29. Opposing wall couplers are used with the E vectors of the combined (−11) modes feeding each coupler in phase. With regard to the $TE_{10}$ mode which exists in the square waveguide between planes 28 and 29, it is noteworthy that energy of this mode is also coupled out by the waveguide couplers placed in the opposing walls, however the signals applied to the opposing branch waveguides resultant to the $TE_{10}$ are out of phase relative to each other. Thus the combined signal existing in the branches between the branch planes 34 and 35 (FIG. 2) and the similar opposing branch planes 36 and 37 (FIG. 2) contains energy in the $TE_{10}$ mode as necessitated by the dimensions employed for the waveguides between planes 34 and 35 and planes 36 and 37, however the energy therein reaching region 38 (FIG. 2) contains some components which are in phase and some which are out of phase depending upon the original energy modes existing in the square waveguide between planes 28 and 29. Since it has been pointed out that the "sum" components, resulting from the combined (−11) modes, contain certain information, they may be combined additively by appropriate coupling in the region 38 by a sidewall coupler placed in the narrow dimension of the waveguide which produces the "sum" of the two signals, whereas part of the signal originally contained as the $TE_{10}$ mode in the square waveguide between planes 28 and 29 may be combined by a "difference" coupler placed in the broad wall of the waveguide in the region 38. Thus waveguide 39 connected to end 25 provides $TE_{10}$ mode energy proportional in amplitude to the magnitude of the combined (−11) modes existing in the square waveguide between planes 28 and 29 whereas waveguide 40 which connects to end 21 provides energy in the $TE_{10}$ mode in dependency on the magnitude of the $TE_{10}$ mode energy existing in the square waveguide between planes 28 and 29.

In general the coupling would be in equal amplitude through branched arms of equal lengths, with one branch, typically that feeding end 21, containing a phase shifting device. By such adjustment of the relative phase of the two feeds it is possible to control the shape of the response pattern of the opening 23, with it being possible to obtain either a broad beam or a narrow beam as desired. Such an arrangement is preferable when broad frequency band operation is desired.

Where narrow frequency band operation is acceptable, the end 21 can be terminated in a short circuit causing the reflection of energy back into the square waveguide between planes 28 and 29. Even with such a short circuit arrangement control of the radiation pattern is readily affected by a slip joint arrangement whereby the effective location of the short may be varied to control the phasing of the reflected energy.

It must be realized that a typical form of coupling of the (−11) modes existing in the square waveguide between planes 28 and 29 has been shown however various other forms of coupling are readily usable such for example, as probe coupling of the square waveguide and the sidearms between planes 34–35, and 36–37.

In conclusion with regard to FIGS. 1 and 2 it is thus seen that an apparatus is provided in which four output signals are obtained, all of which are obtained in the $TE_{10}$ mode, however, the relative phases and magnitudes of these signals vary in dependency on the angle of receipt of energy as it impinges upon the open end of the horn 23. Where energy impinges with a wave front which is parallel to the opening 23, namely, from a direction on the longitudinal axis 26, there will be no appreciable output from either end 24 or 25, there being output realized only from the ends 21 and 22. Where the direction of arrival of incident energy differs from that of the longitudinal axis 26, energy will be realized from either or both of the ends 24 and 25 in dependency upon the angular displacement from the longitudinal axis 26 and of an instantaneous relative polarity dependent upon the direction of displacement from the longitudinal axis 26.

Displacements from axis 26 in the E plane will be accompanied by the production of output from output end 24 whereas variations from the axis 26 in the H plane will be accompanied by the production of output signals from the end 25.

The optimum operation of the device of FIG. 1 requires careful attention to impedance matches at the various portions where transformations occur and in many instances the use of various forms of conventional impedance transformation devices such as an iris may have desirable matching effects. It is of course understood that the incorporation of such matching devices is well within the knowledge of those skilled in the art.

The two output signals as obtained from output ends 21 and 22 represent incident energy which excites the basic $TE_{10}$ mode in the square waveguide between planes 28 and 29. This energy would normally be combined by suitable means such as a magic-T or other coupling device whereby the relative amplitude of the signals as well as the phase of the coupling may be readily controlled to secure optimum impedance matching.

The apparatus of FIGS. 3 and 4 is a variation of the apparatus previously described in connection with FIGS. 1 and 2 whereby a reduction in physical size may be realized, however the principles of operation of the apparatus of FIGS. 3 and 4 are essentially the same as with the apparatus of FIGS. 1 and 2. The apparatus of FIGS. 3 and 4 has a longitudinal axis of directivity 50 as indicated. In reception, radiant energy enters the opening 51 which is tapered to the cross-sectional dimension of a square waveguide section between transverse planes 52 and 53 having dimensions which will support the modes $TE_{10}$, $TE_{20}$, $TE_{11}$, $TM_{11}$. Thus as with the apparatus of FIGS. 1 and 2, the apparatus of FIGS. 3 and 4 has a short section of square waveguide wherein four basic modes of energy propagation may be set up in dependency upon the angle of incidence of a wave front upon the opening 51. At the end of the square waveguide represented by the plane 53 are connected a pair of waveguides 54–55 which are proportioned so as to support the $TE_{20}$ mode of propagation. The energy thus contained in the square waveguides between planes 52–53 is coupled out by virtue of the two waveguide sections wherein energy is propagated in the $TE_{20}$ mode.

The original $TE_{10}$ mode couples to the double-width guides 54 and 55 out of phase while the $TE_{11}$ and $TM_{11}$ modes couple to the guides 54 and 55 in the form of the $TE_{10}$ mode in which components are in phase. The energies of the original $TE_{10}$ mode and the (−11) modes are separated by a magic-T indicated in general by the numeral 56, the $TE_{10}$ being withdrawn from the "difference" port 57 placed in the broad wall of the magic-T whereas the energy of the (−11) modes is extracted from the "sum" port 58 which is placed in the sidewall of the magic-T. The outputs from both 57 and 58 are realized in the $TE_{10}$ mode which likewise exists in the intermediate waveguide sections between planes indicated generally as 59 and 60 and 61 and 62. However, the $TE_{20}$ mode is reflected by the tapers indicated generally between planes 63–59 and 64–61 which appear as short circuits to the $TE_{20}$ mode. Energy of this mode is thus reflected and picked-up by the magic-T indicated in general by numeral 65 which is placed in the broad wall to provide the "difference" output since the coupling of the original $TE_{20}$ mode from the square waveguide 52–53 is out of phase to each of the waveguides 54–55. In this particular instance the conventional sidewall or "sum" coupler from magic-T 65 is not used and is replaced by a continuous side wall. Thus the apparatus of FIGS. 3 and 4 has only three output coupling terminals as compared to the four employed with the apparatus of FIGS. 1 and 2, however this is of course a matter of engineering choice.

FIGS. 5, 6, 7 and 8 indicate a further variation of the present invention permitting even greater reduction in size. Although the arrangement of FIGS. 5–8 is somwhat different, this apparatus is very close to the apparatus of prior FIGS. 3 and 4, the difference being primarily in the elimination of much of the open space between the prior waveguides 54 and 55.

In FIGS. 5–8, outputs 75, 76, 77 correspond respectively to the outputs 57, 58, 66. Output 77 is at the end of a waveguide 78 which extends into the rectangular member 79 ending in transversely open portions 80 which replace the ends of magic-T 65 which is coupled to waveguides 54 and 55 in FIG. 3. As shown in FIG. 6, the waveguide 78 and the interior transverse openings therein are formed in part by an inner U-shaped member which also assists in maintaining the complete structure in alignment.

To improve impedance matching, a septum 82 or other device may be placed in the output line 75. It is of course understood that the inclusion and exact placement of such a device is a matter of trial and error within the capabilities of those ordinarily skilled in the art following comprehension of the basic teachings of the present disclosure.

FIG. 9 indicates in general how a horn system constructed in accordance with the foregoing would be incorporated into a radio frequency system such as a direction finder although it is readily appreciated that the system of FIG. 9 could operate as a radar system with the inclusion of a transmitter.

The horn system indicated in general by numeral 85 has ports corresponding to those numbered 75, 76, 77 in FIGS. 5 and 6. The port 75 is the basic port by means of which the principal component of received energy is obtained and by which energy for transmission would be supplied to the horn system 85, which is a primary radiator, for illumination of the secondary radiator, lens 86. Lens 86 and horn system 85 are positioned in azimuth and elevation angle by a suitable positioning device 87. The complete system includes a conventional indicator 88 and combining circuits 89 which are a collection of conventional components arranged by those skilled in the art to provide the desired routing of signals. In a simple form combining circuits 89 could be as shown in FIG. 10 including the mixers and I.F. amplifiers 90, 91, 92, local oscillator 93, phase detectors 94, 95, detector 96 with outputs as indicated going to indicator 88 and positioning device 87.

Obviously many modifications and variations of the present invention are possible in the light of the above teachings. It is therefore to be understood that within the scope of the appended claims the invention may be practiced otherwise than as specifically described.

What is claimed is:

1. In combination, a first waveguide capable of supporting energy propagation in the $TE_{10}$, $TE_{20}$, $TE_{11}$ and $TM_{11}$ modes, a second waveguide capable of supporting energy propagation in the $TE_{10}$ and $TE_{20}$ modes, a third waveguide capable of supporting energy propagation in the $TE_{10}$ mode, first selective energy transfer means capable of transmitting the $TE_{10}$ and $TE_{20}$ modes for coupling the first and second waveguides, second selective energy transfer means capable of transmitting the $TE_{10}$ mode for coupling the second and third waveguides, means for coupling energy from said first waveguide in dependency on the $TE_{11}$ and $TM_{11}$ energy contained therein, and means for coupling energy from said second waveguide in dependency on the $TE_{20}$ mode energy contained therein.

2. In combination, a first waveguide capable of supporting energy propagation in the $TE_{10}$, $TE_{20}$, $TE_{11}$ and $TM_{11}$ modes, a second waveguide capable of supporting energy propagation in the $TE_{10}$ and $TE_{20}$ modes, selective energy transfer means capable of transmitting the $TE_{10}$ and $TE_{20}$ modes coupling the first and second waveguides, means for coupling energy from said first waveguide in dependency on the $TE_{11}$ and $TM_{11}$ energy contained therein, and selective coupling means for providing separate output signals in dependency on the $TE_{10}$ and $TE_{20}$ modes of energy contained in the second waveguide.

3. In combination, a first waveguide capable of supporting energy propagation in the $TE_{10}$, $TE_{20}$, $TE_{11}$ and $TM_{11}$ modes, first and second waveguide means capable of supporting energy propagation in $TE_{20}$ mode connected to opposing sides of said first waveguide means for withdrawing energy therefrom, means producing a first output signal in dependency on the difference between signals in the first and second waveguide means, means for withdrawing first and second signals from said first and second waveguide means respectively in dependency on $TE_{10}$ mode energy contained therein, and means deriving separate output signals in dependency on the sum and difference of the first and second signals.

4. In combination, a first section of waveguide capable of supporting energy propagation in the $TE_{10}$, $TE_{20}$, $TE_{11}$ and $TM_{11}$ modes, a second section of waveguide capable of supporting energy propagation in the $TE_{10}$ and $TE_{20}$ modes, a third section of waveguide capable of supporting energy propagation in the $TE_{10}$ mode, first and second transition sections connecting the first, second and third waveguide sections in sequence, means for coupling to the $TE_{11}$ and $TM_{11}$ modes in said first section of waveguide, and means for coupling to the $TE_{20}$ mode in said second section of waveguide.

5. In a radio energy operative locator system, a rectangular waveguide capable of supporting energy propagation in the $TE_{10}$, $TE_{20}$, $TE_{11}$ and $TM_{11}$ modes, said waveguide having an open end orientable in the direction of receipt of radio energy, means separately extracting energy from said waveguide in dependency on the $TE_{10}$, on the $TE_{20}$ and the combined $TE_{11}$ and $TM_{11}$ modes existing therein, and means deriving error signals in proportion to the relationship of the $TE_{20}$ and combined $TE_{11}$ and $TM_{11}$ to the $TE_{10}$ signals.

References Cited by the Examiner

UNITED STATES PATENTS

| | | |
|---|---|---|
| 2,759,154 | 8/1956 | Smith et al. _____ 333—11 |
| 2,956,275 | 10/1960 | Ashby. |
| 2,965,898 | 12/1960 | Lewis. |

OTHER REFERENCES

"Microwave Theory and Techniques," by Reich, Ordung, Krauss, and Skalnik, D. Van Nostrand Company, Inc., New York, N.Y., 1953, pp. 291–294.

HERMAN KARL SAALBACH, *Primary Examiner.*

CHESTER L. JUSTUS, *Examiner.*

R. E. BERGER, *Assistant Examiner.*